R. A. LANCEY.
COUNTER CUTTING MACHINE.
APPLICATION FILED AUG. 14, 1907.

1,054,216.

Patented Feb. 25, 1913.
8 SHEETS—SHEET 1.

Fig. 1.

Witnesses
Edward S. Day
A. C. Richardson.

Inventor
Roswell A. Lancey
by
Phillips Van Everen & Fish
Attys

R. A. LANCEY.
COUNTER CUTTING MACHINE.
APPLICATION FILED AUG. 14, 1907.

1,054,216.

Patented Feb. 25, 1913.
8 SHEETS—SHEET 3.

Fig. 4.

Witnesses
Edward S. Day
A. C. Richardson.

Inventor
Roswell A. Lancey
by
Phillips Van Everen & Fish
Atty's

Fig.5.

R. A. LANCEY.
COUNTER CUTTING MACHINE.
APPLICATION FILED AUG. 14, 1907.

1,054,216.

Patented Feb. 25, 1913.
8 SHEETS—SHEET 5.

Witnesses
Edward S. Day
A. C. Richardson

Inventor
Roswell A. Lancey
by
Phillips Van Everen & Fish
Attys

R. A. LANCEY.
COUNTER CUTTING MACHINE.
APPLICATION FILED AUG. 14, 1907.

1,054,216.

Patented Feb. 25, 1913.
8 SHEETS—SHEET 6.

Witnesses
Edward S. Foy
A. C. Richardson

Inventor
Roswell A. Lancey
by Phillips Van Everen & Fish
Attys

R. A. LANCEY.
COUNTER CUTTING MACHINE.
APPLICATION FILED AUG. 14, 1907.

1,054,216.

Patented Feb. 25, 1913.

Witnesses
Edward S. Day
A. C. Richardson

Inventor
Roswell A. Lancey
by
Phillips Van Everen & Fish
Attys.

R. A. LANCEY.
COUNTER CUTTING MACHINE.
APPLICATION FILED AUG. 14, 1907.

1,054,216.

Patented Feb. 25, 1913.

Witnesses
Edward S. Day
A. C. Richardson

Inventor
Roswell A. Lancey
by Phillips Van Everen & Fish
Attys

UNITED STATES PATENT OFFICE.

ROSWELL A. LANCEY, OF TOWNSEND, MASSACHUSETTS, ASSIGNOR, BY MESNE ASSIGNMENTS, TO LEON C. SPAULDING, HUNTLEY N. SPAULDING, AND ROLAND H. SPAULDING, ALL OF ROCHESTER, NEW HAMPSHIRE, AND EMMA C. SPAULDING AND MARION L. SPAULDING, BOTH OF BOSTON, MASSACHUSETTS, COPARTNERS AS J. SPAULDING & SONS COMPANY, OF ROCHESTER, NEW HAMPSHIRE.

COUNTER-CUTTING MACHINE.

1,054,216.      Specification of Letters Patent.      Patented Feb. 25, 1913.

Application filed August 14, 1907. Serial No. 388,458.

*To all whom it may concern:*

Be it known that I, ROSWELL A. LANCEY, a citizen of the United States, residing at Townsend, in the county of Middlesex and State of Massachusetts, have invented certain new and useful Improvements in Counter-Cutting Machines; and I do hereby declare the following to be a full, clear, and exact description of the invention, such as will enable others skilled in the art to which it appertains to make and use the same.

The invention relates to counter cutting machines and more especially to that class of machines in which a skived counter blank is formed by bending a partially formed blank into a dished shape and shaving off the projecting edges of the dished blank to remove the surplus stock and complete the bevel edge of the blank.

One of the objects of the invention is to provide a machine of this character which is adapted to separate individual blanks from a stack or pile and deliver them in rapid succession to the bending and cutting devices by which the surplus stock is removed and the edges properly beveled. By thus feeding and cutting the blanks the rapidity with which the finished blanks may be produced is increased. The partially formed blanks may also be rapidly cut and stacked in a separate machine and the stacked blanks conveniently supplied to the feeding devices of the machine embodying the present invention. This enables the mechanisms for operating upon the blanks to be simplified and also enables the operations incident to the forming of the blanks to be rapidly and uniformly performed.

Further features of the invention relate to devices whereby the skived blanks may be delivered and stacked for convenient removal from the machine and further manipulation in forming the counters.

The above features as well as the further features of the invention which are set forth in the claims will be understood from an inspection of the accompanying drawings illustrating a machine embodying all the various features of the invention in their preferred forms.

In these drawings.

In the machine shown in the drawings the blanks which are to be operated upon are supplied from a magazine in which the blanks are stacked in uniform relation. This magazine may be a fixed part of the machine in which the supply of blanks is placed but is preferably in the form of a removable tray which may be placed in position and may be removed after the supply of blanks therein is exhausted and another full tray substituted in its place. As shown the magazine comprises a removable tray 1, the front end of which is supported by two brackets 2 and 3. The brackets 2 and 3 are provided with vertical and horizontal plates which are recessed to receive the end of the tray 1 and form continuations of the side and bottom plates of the tray. (Figs. 1, 2, 4 and 8). The brackets are secured to a vertical front plate 4 which is in turn adjustably secured to the top plate 5 of the machine for a purpose to be described. The bracket 3 is secured to the plate 4 in fixed position while the bracket 2 is adjustably secured to the plate by a bolt 6 passing through a slot in the bracket 2 and engaging one of a series of holes 7 in the plate 4. By adjusting the bracket 2 the distance between the brackets 2 and 3 may be varied to receive trays of different widths and adapted to carry blanks of different lengths.

The blanks in the magazine formed by the tray 1 and brackets 2 and 3 are fed forward as individual blanks are separated from the end of the series in the magazine, by means of a follower block 8 mounted in the tray and forced forward by means of a weight 9. The weight is connected with the follower block by means of a cord 10 which passes over guide pulleys 11 and is connected with a bar 12 arranged to engage hooks 13 which depend from the block.

The plate 4 is secured to the top plate of the machine by means of bolts 14 which pass through slots in the plate. By reason of this connection the plate 4 may be adjusted to bring the magazine carried thereby into proper relation to the devices to which the blanks are delivered from the magazine.

The front blank in the magazine rests against the front face of a reciprocating feed slide 15 which is mounted in guideways in the plate 4. The blanks at the front end of the magazine are held in position against the bottom of the magazine by a retaining finger 16 which overlies the blanks and is adjustably secured to the plate 4 by means of a bolt 17 which passes through a slot in the vertical part of the finger. The bracket 3 carries a slide 18 which may be adjusted to regulate the space between the end of the slide and the front face of the feed slide, through which the blanks are fed, in accordance with the thickness of the blanks being operated upon. The slide 18 acts as a separator to prevent the passage of more than one blank under the action of the reciprocating feed slide. A thin plate 19 is secured to the front face of the feed slide and the front end of this plate forms a shoulder 20 for engaging the end of the foremost blank in the magazine and forcing it out of the magazine as the feed slide is advanced.

When the feed slide is advanced the shoulder 20 engages the foremost blank in the magazine and carries it out of the magazine and into position between a supporting plate 21 and a coöperating holding plate 22. The feed slide 15 is so arranged that it extends back of the supporting plate 21 and the edge of the supporting plate is beveled at 23 and is provided with fingers 24 projecting into slots 25 formed in the front face of the feed slide so that the blank as it is carried forward by the feed slide will ride up the inclined end 23 of the plate and be directed between this plate and the holding plate 22. The edge of the plate 22 is beveled at 26 to insure the passage of the blank between the supporting and holding plates. The holding plate 22 is carried on the lower end of a spring 27 and is held yieldingly against the face of the supporting plate 21 by a leaf spring 28. The holding plate and spring 28 are secured in fixed position by means of bolts 29 passing through the upper ends of the springs 27 and 28, through slots 30 in the supporting plate 21 and into holes in the top plate 5 of the machine. By reason of the slots 30 in the supporting plate 21 this plate may be adjusted to correspond with the adjustments of the front plate 4 in adapting the machine to operate upon different sizes of blanks.

The feed slide is reciprocated at proper intervals through a rock shaft 31 mounted in suitable bearings upon the top plate 5 and provided at its forward end with an arm 32 through which it is connected with the feed slide. The lower end of the arm 32 is provided with a slot 33 in which is mounted a block 34. This block is pivotally connected with a stud 35 which is adjustably secured in a slot 36 in the feed slide. By this connection the feed slide is reciprocated by the rocking movement of the rock shaft 31 and the point of connection between the feed slide and the arm 32 may be adjusted to suit the position of the plate 4 and in accordance with the size of the blanks being operated upon.

Figure 1:
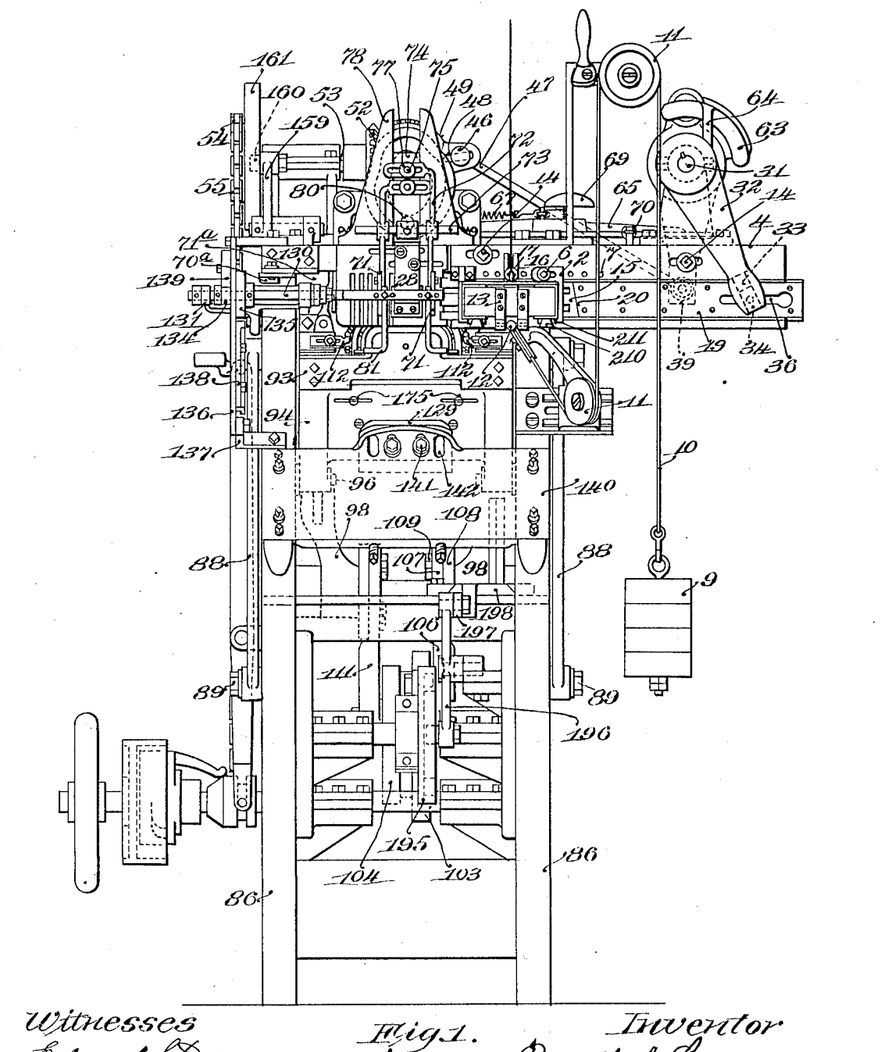
Figure 1 is a front elevation of the machine.
Figures 2, 3:
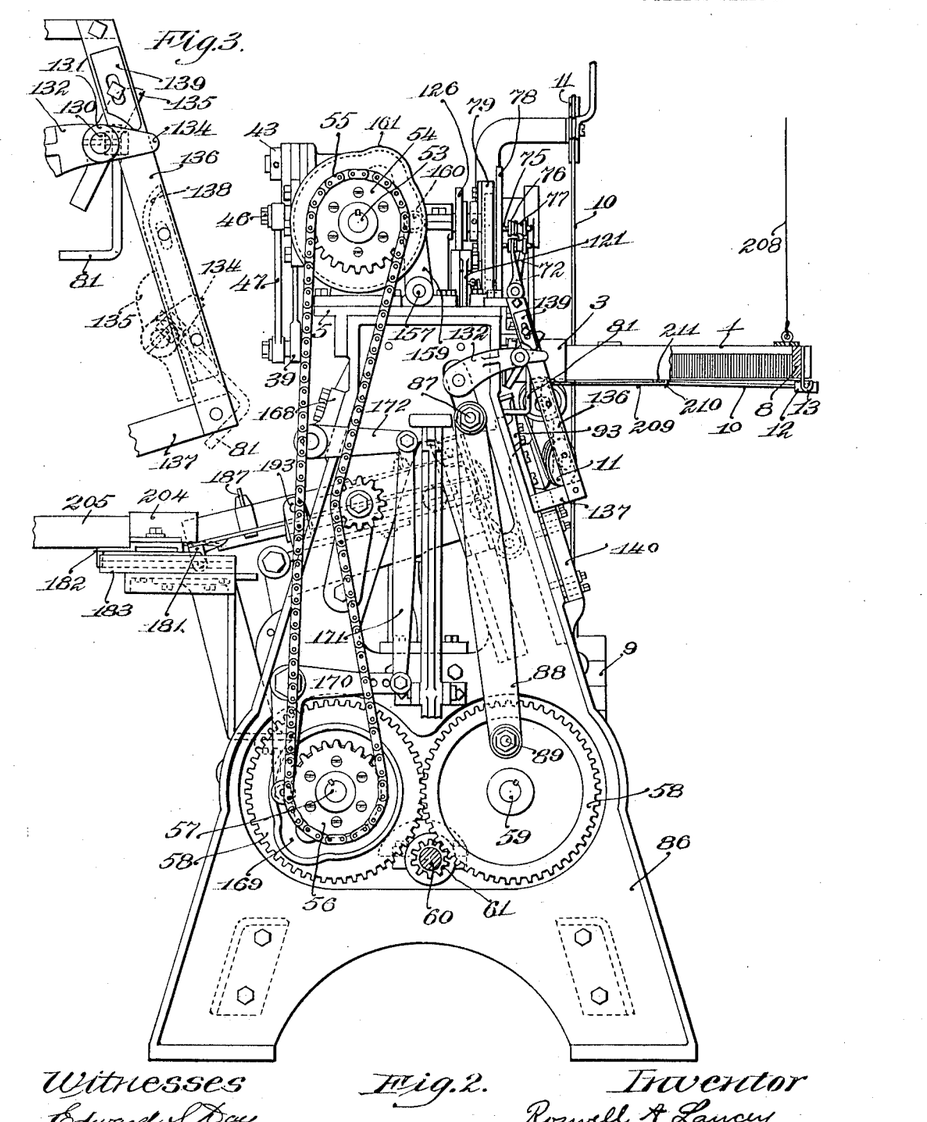
Fig. 2 is a side elevation looking toward the right in Fig. 1.
Fig. 3 is an enlarged detail of the devices for operating the stop fingers which position the blank with relation to the mold.
Figure 10:
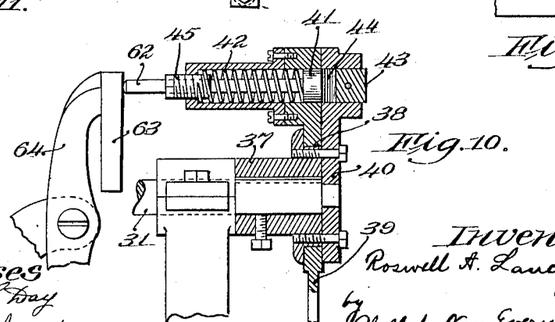

The rock shaft 31 is operated through devices which will yield in case there is any unusual obstruction to the forward movement of the feed slide such as might be caused by failure to properly feed and position a blank, and devices are also provided for indicating to the operator that the feeding mechanism is not acting properly. These devices are best shown in Figs. 1 and 8 to 11. As shown in Fig. 10 a collar 37 is secured to the end of the rock shaft 31 and is provided with a bearing 38 for an operating arm 39. The arm 39 is loosely mounted on the bearing 38 and is held in position on the bearing by a plate 40 which is bolted to the collar 37. The operating arm 39 carries a pawl 41 the front end of which is forced toward the plate 40 by a spring 42. The plate 40 carries a block 43 in which a recess is formed to receive the end of the pawl 41. The side 44 of the pawl which acts during the advancing stroke of the feed slide is beveled so that the resistance offered to the forward movement of the feed slide and rock shaft 31 tends to force the pawl out of the recess in the block 43 against the tension of the spring 42. The tension of the spring may be regulated by the nut 45 so that the spring will act to maintain the pawl in engagement with the recess in the block 43 unless there is unusual resistance to the forward movement of the feed slide. In case a blank is not properly fed and prevents the forward movement of the feed slide the pawl 41 will ride out of the recess in the block 43 and thus disconnect the operating arm 39 from the plate 40 and rock shaft 31. As soon as the obstruction is removed the pawl will again engage the recess in the block 43 and the reciprocation of the feed slide will continue so long as the blanks are properly fed. The operating arm 39 is continuously oscillated during the operation of the machine by a crank pin 46 with which the lower end of the arm is connected by a link 47. The crank pin 46 is secured in a radial slot 48 formed in a crank disk 49 so that the crank pin may be adjusted to vary the throw of the operating arm and thus vary the distance through which the feed slide is reciprocated in adjusting the machine for blanks of different length. The crank disk 49 is secured to a disk 50 which is in turn secured to a continuously rotating shaft 51. The connection between the crank disk and disk 50 is such that the crank disk may be adjusted angularly to secure the proper timing of the feed slide. The shaft 51 is connected through beveled gearing 52 with a shaft 53 to the outer end of which is secured a sprocket wheel 54. The shaft 51 is continuously driven through a sprocket chain 55 which passes over the sprocket wheel 54 and a second sprocket wheel 56 which is secured to a shaft 57 (Fig. 2). The shaft 57 is connected through gears 58 with a parallel shaft 59 and these shafts are continuously driven from the main driving shaft 60 through a pinion 61 which engages one of the gears 58.

Figure 8:
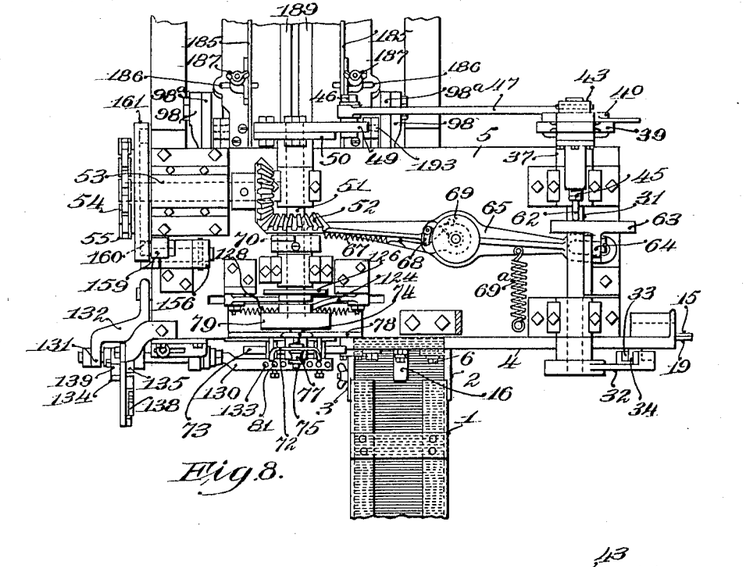
Fig. 8 is a partial plan view.
Figure 9:
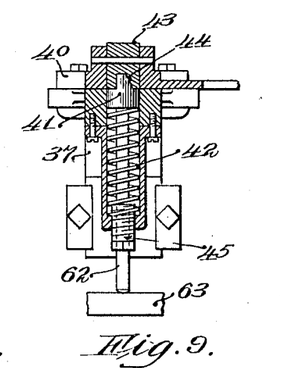
Figs. 9 and 10 are details of the mechanism for operating the feed slide.
Figure 11:
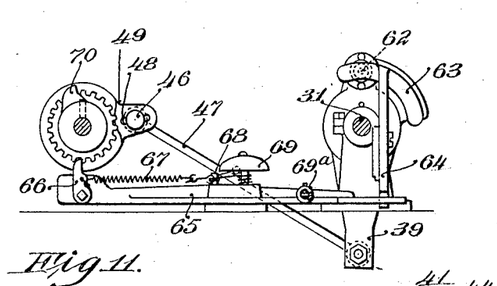
Fig. 11 is a detail of the alarm mechanism.

The devices for indicating to the operator when the feed slide becomes disconnected from its operating mechanism are shown in Figs. 8 and 11. The pin 62 on which the pawl 41 is formed projects rearwardly and moves back and forth in front of a segment 63 formed on the upper end of a lever 64. The lower end of the lever engages the notched end of a horizontal lever 65 which carries a pivoted dog 66 at its other end. The dog 66 is connected through a spring 67 with the hammer 68 of a gong 69. The levers 65 and 64 are held in normal position by a spring 69ª. When the parts are in normal position the segment 63 is in engagement with the end of the rod 62 and the dog 66 is held out of the path of the cam 70 which is formed on the hub of one of the gears 52. When the pawl 41 is forced back out of the recess in the block 43 by reason of the failure of the feed slide to properly feed a blank, the lever 64 and lever 65 are rocked so as to bring the dog 66 into the path of the cam 70. Now as the gear 52 revolves the cam 70 strikes the dog 66 at each revolution of the gear, causing the hammer 68 to strike the gong 69. The ringing of the gong therefore continues until the operator removes the obstruction to the movement of the feed slide, when the parts return to their normal position and the feeding of the blanks is resumed.

When a blank is advanced by the feed slide into position between the supporting plate 21 and holding plate 22 it is held between these plates until the mold and presser come into position to receive the blank, when it is fed from between the plates and delivered to the devices which position it with relation to the mold. In order that the blank may be accurately positioned between the supporting plate and clamping plate by the advance movement of the feed slide an adjustable stop 70ª is secured to the top plate 5 in position to be engaged by the front end of the feed slide as it reaches its advanced position. A guard plate 71ª is also arranged back of the path of the feed slide to engage the rear side of the slide and direct its front end against the stop 70ª. This guard plate also acts to maintain the feed slide in close relation to the back of the supporting plate 21 when the forward part of the slide projects to the greatest extent beyond the end of the guide-ways in the plate 4.

Figure 5:
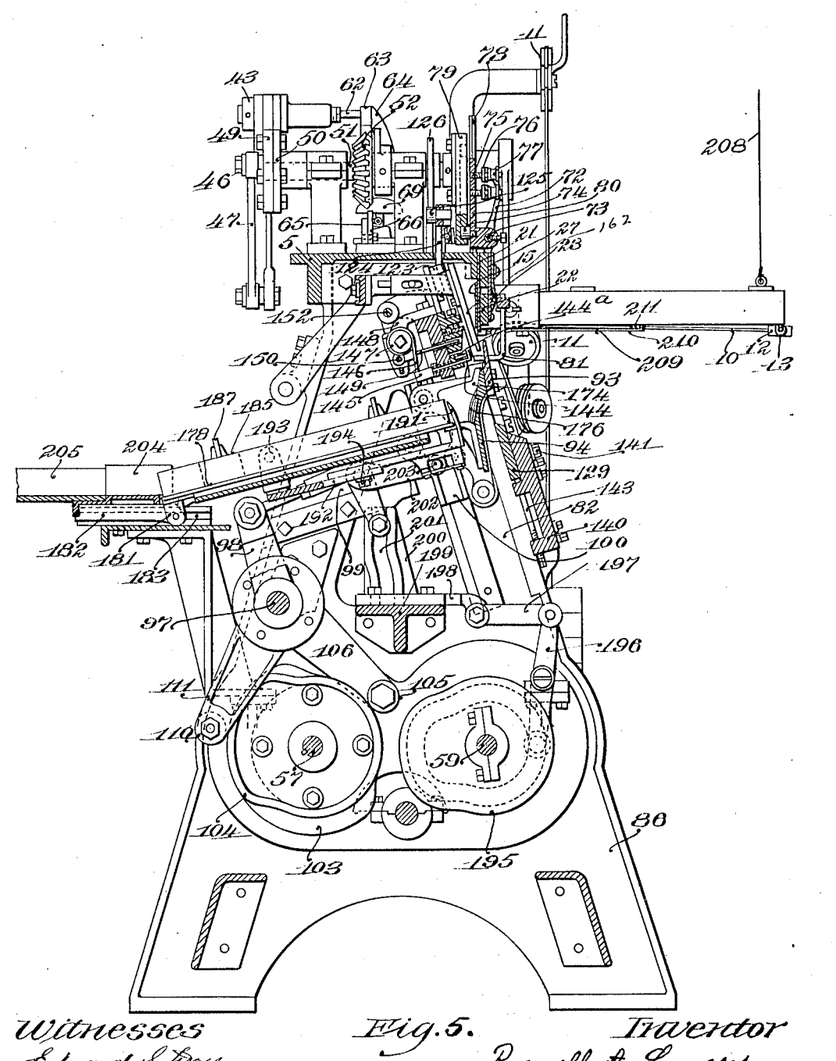
Fig. 5 is a vertical central section through the mold and presser.

The feeding devices for removing the blank from between the supporting and holding plates consist of two feeding fingers 71 (Fig. 1), the lower ends of which are arranged to engage vertical slots 72ª and 72ᵇ formed in the front face of the supporting plate 21. The feeding fingers 71 are secured upon levers 72 which are pivoted upon a bar 73 carried by a vertically reciprocating slide 74. The upper ends of the levers 72 are provided with lateral extensions which are slotted to receive studs 75. The studs 75 project from the slide 74 and are provided with collars 76 which are threaded on the bolts and underlie lateral extensions of the levers 72 (Figs. 2, 5 and 8). The studs 75 are also provided with clamping nuts 77 for clamping the levers 72 against the collars 76. By adjusting the collars 76 on the studs the levers 72 may be swung about the supporting rod 73 to bring the ends of the feeding fingers 71 into proper position in the slots in the supporting plate. The lateral slotted extensions of the levers enable the levers to be adjusted longitudinally on the supporting rod 73 so as to accommodate the adjustment of the supporting plate 21 for different lengths of blanks, and also to bring the feeding finger at the left in Fig. 1 into register with the proper slot in the series of slots 72ᵇ.

The feeding fingers may therefore be positioned to engage the blank at substantially equal distances on opposite sides of the clamping plate 22 and at the proper distance from the clamping plate to accurately feed blanks of different lengths.

The slide 74 which carries the feeding fingers is mounted between vertical guide plates 78 and is reciprocated at proper intervals by means of a cam groove formed in a cam disk 79 which is secured to the shaft 51. A roll 80 is mounted on the rear side of the slide 74 and engages the cam groove in the disk 79 (Fig. 5).

Figure 4:
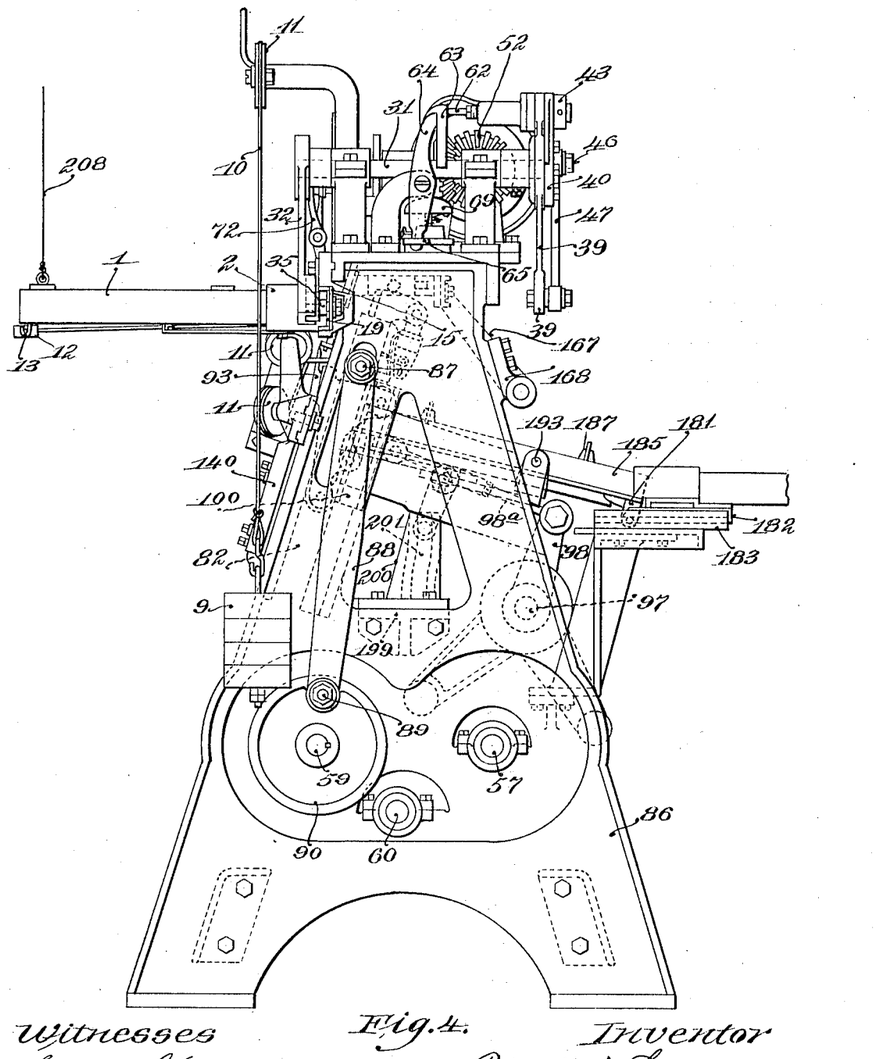
Fig. 4 is a side elevation looking toward the left in Fig. 1.
Figures 6, 7:
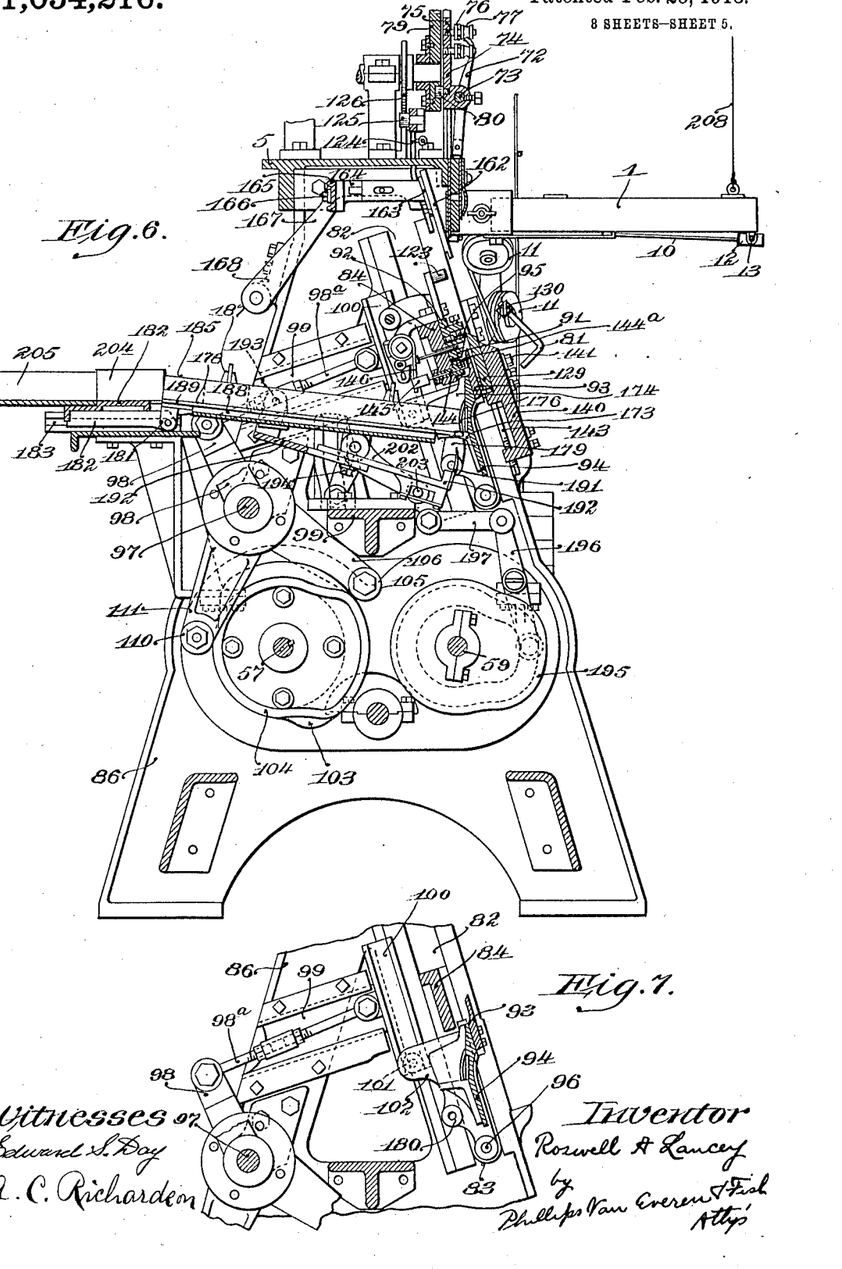
Fig. 6 is a similar view showing the parts in a different position.
Fig. 7 is a detail of the mechanism for operating the presser.
Figure 16:
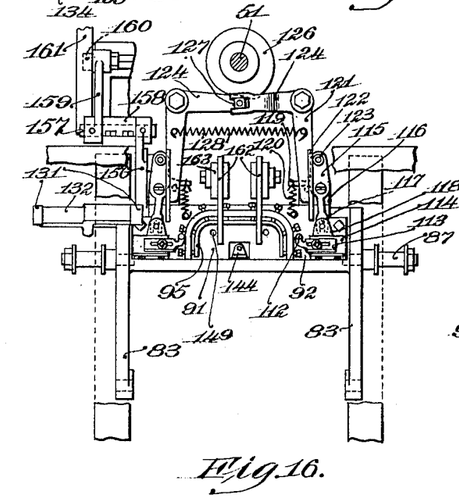
Fig. 16 is a detail front view of the mold carrying slide and certain parts coöperating therewith.
Figure 17:
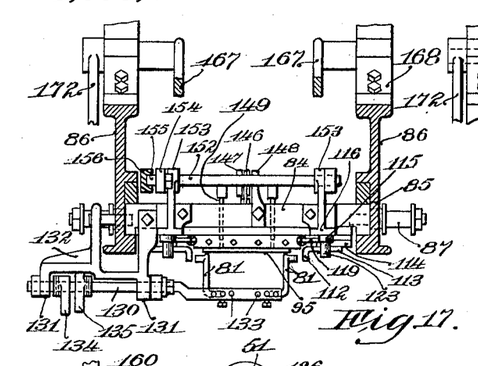
Fig. 17 is a sectional plan view of the parts shown in Fig. 16.

The blank is removed from between the supporting and clamping plates by the downward movement of the feeding fingers 71 and is delivered upon supporting stop fingers 81 and between the mold and presser (Fig. 5). These blank supporting fingers as well as the mold and presser are carried upon a reciprocating carriage mounted in guide-ways 82 formed in the sides of the frame of the machine. This carriage comprises two side pieces 83 and a cross bar 84 connecting the upper ends of the side pieces (Figs. 7, 16 and 17). The side pieces 83 fit within guide-ways 85 in the opposite sides of the frames 86 of the machine and are provided with outwardly projecting studs 87 which extend through slots in the side of the frames. These studs are connected by links 88 with crank pins 89 one of which is carried by one of the gears 58 (Fig. 2), and the other of which is carried by a disk 90 secured to the opposite end of the shaft 59 (Fig. 4).

Figure 19:
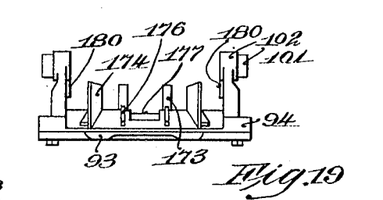
Fig. 19 is a top view of the frame which carries the presser.
Figure 20:
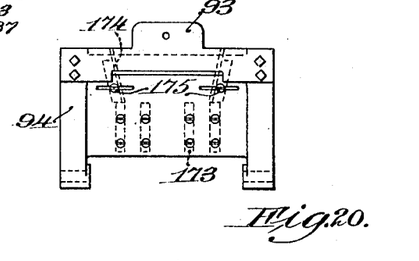
Fig. 20 is a front view of the same.
Figure 21:
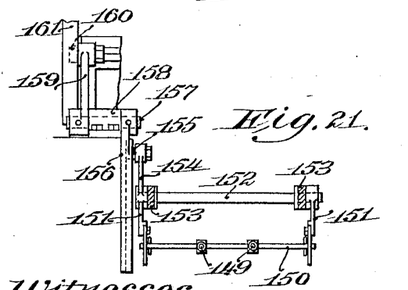
Figs. 21 and 22 are details of the mechanism for operating the ejectors which force the blank out of the mold.
Figure 22:
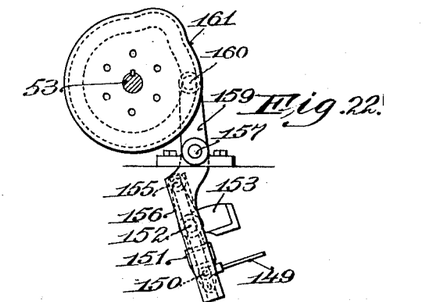

The mold 91 is formed in a mold block 92 which is removably bolted to the cross bar 84 of the carriage, and may be removed and replaced by a different mold block in adapting the machine for different sizes and shapes of blanks. The presser comprises a plate 93 secured upon a carrier plate 94 and arranged to coöperate with the mold in bending the blank into a dished shape and holding it with the surplus material projecting over the steel strip 95 which forms the rear of the mold, so that this projecting portion may be cut off on a bevel by the skiving cutter. The carrier plate 94 is mounted between the side pieces 83 of the carriage 84 and the lower end of the plate is connected to the carriage by pivots 96. The presser carrier-plate is swung about its pivots to move the presser toward and from the mold through the movement of a rock shaft 97 (Fig. 7), which is connected by means of two arms 98 and adjustable links 98ª with slides 99 mounted upon the opposite side frames 86 of the machine. These slides 99 are provided at their forward ends with guide-ways 100 which are engaged by rolls 101 mounted on the presser carrier-plate 94. These rolls are mounted in lugs 102 which project rearwardly from the ends of the plate (Figs. 7 and 19). During the reciprocation of the carriage 84 the rolls 101 move up and down in the guide-ways 100, and during this travel of the rolls the slides 99 are moved forward and back at proper intervals to effect the clamping of the material in the mold, and to release the blank after the cutting has been completed. The rock shaft 97 is rocked to give the slides 99 this movement by the action of two cams 103 and 104 which are secured upon the shaft 57. The cam 103 engages a roll 105 mounted on the lower end of an arm 106, the upper end of which is provided with a hub 107 secured to a similar hub 108 on one of the arms 98 by bolts 109. The cam 104 engages a roll 110 carried by the lower end of an arm 111 which is secured to the other arm 98 in a similar manner (Figs. 1, 5 and 6). By the action of the double cam 103 and 104 on the arms 106 and 111 the forward and backward movements of the slides 99 are positively effected and controlled. By operating the presser from a rotary cam through suitable connecting devices, I am enabled to increase the speed of the machine and at the same time reduce the friction and wear on the parts. This also enables the movements of the presser to be timed so that the opening and closing of the presser may occur at different points in the travel of the presser carriage.

When the mold carrying carriage is at the upper end of its stroke as indicated in Fig. 5, the presser carrying-plate 94 is swung forward as indicated in this figure so that the blank may be introduced between the presser and the mold. When the mold and presser are in this position the stop fingers 81 are in advanced position and extend inward on opposite sides of the presser into position to receive the blank and position it vertically between the presser and mold. When the blank is delivered on to these supporting fingers it is positioned horizontally by the action of centering fingers 112 which are mounted upon the mold block and are moved inward against the ends of the blank. The centering fingers 112 project forward from plates 113 which are adjustably secured upon slides 114 suitably guided upon the mold block. By adjusting the plates 113 on the slides 114 the centering fingers 112 may be brought into proper relation to center the blanks. The slides 114 are moved toward each other at proper intervals to center the blank and are moved away from each other preparatory to the introduction of the succeeding blank by means of levers 115. These levers are pivoted upon brackets 116 secured to the mold carrying slide, and are provided at their lower ends with slots 117 which engage pins 118 on the finger carrying slides. The slots 117 are open at their lower ends so that the pins 118 may be readily engaged with the slots in changing the mold blocks for different sizes of blanks. The levers 115 are provided with projecting arms 119 and the levers are held normally in position with the centering fingers retracted by means of springs 120 connected to the arms 119 and to fixed points on the mold block. The levers 115 are operated to advance the centering fingers by means of bell-crank levers 121 which are provided with ribs 122 engaging rolls 123 which are mounted upon the upper ends of the levers 115. The ribs 122 are of such length that the rolls 123 remain in contact with them during a part of the downward movement of the mold carrying carriage and until the presser has forced the blank into the mold.

The bell crank levers 121 are provided with horizontally extending arms 124, one of which carries a roll 125 arranged to engage the periphery of a cam 126 which is secured to the shaft 51. The pivot of this roll extends through the arm 124 and carries a block 127 which fits within a slot in the end of the other arm 124 (Fig. 16). The roll 125 is held in engagement with the cam 126 by the action of a spring 128 which connects the two vertical arms of the bell crank levers. By the action of the cam 126 the bell crank levers are rocked in unison at the proper time to operate the levers 115 and move the centering fingers 112 toward each other to center the blank with relation to the mold and presser and to maintain the blank in centered position until it is clamped between the mold and presser.

After the blank has been delivered between the mold and presser and centered, the mold carrying carriage moves downward and during the first part of this movement the presser is operated to force the blank into the mold, the supporting fingers 81 remaining in advanced position until this operation is completed. The fingers 81 are then retracted, and during the continued downward movement of the mold carrying carriage the presser and mold are carried under the skiving cutter 129 which acts to shave off the material projecting over the edges of the strip 95 of the mold.

The blank supporting fingers 81 are secured in the end of a rock shaft 130 which is mounted in bearings 131 formed on a bracket 132 which is secured to the mold carrying slide or carriage (Figs. 1, 2, 16 and 17). The rock shaft is provided with series of holes 133 for receiving the upper ends of the fingers 81 and the positions of the fingers may be varied to suit the length of the blank being operated upon by securing the fingers in the proper holes of the series. The rock shaft 130 is rocked to advance and retract the fingers 81 through two arms 134 and 135 which are secured to the shaft. These arms are arranged to travel on opposite sides of a cam supporting bar 136 which is secured upon brackets 137 projecting from one of the side frames 86 of the machine (Figs. 2 and 3). During the downward travel of the mold carrying carriage the arm 135 rides against the end of a cam 138 adjustably mounted on the bar 136 and operates the rock shaft 130 to retract the fingers 81 and retain them in retracted position as indicated in dotted lines in Fig. 3. During the upward travel of the mold carrying carriage and after the skived blank has been delivered from between the mold and presser, the arm 134 rides against the lower end of the cam 139 which is adjustably secured to the bar 136 so that the rock shaft is operated to advance the fingers 81 into position to receive the succeeding blank, as indicated in Fig. 5, and in full lines in Fig. 3. The skiving cutter 129 is secured in the cutter carrying block 140 by means of bolts 141 passing through slots 142 formed in the bar. The position of the cutter may be varied by means of adjusting screws 143 upon the upper ends of which the lower edge of the cutter is supported.

After the blank has been operated upon by the skiving cutter the mold carrying carriage is returned from the position indicated in Fig. 6 to the position indicated in Fig. 5. During this upward movement the presser is moved outward away from the mold to allow the skived blank to be delivered from between the mold and presser preparatory to the introduction of a new blank. A punch 144[a] is arranged in the lower central part of the mold and is surrounded by a spring-pressed stripper 144 which acts to strip the blank from the punch when the presser is retracted. This stripper extends rearwardly through the cross bar 84 of the mold-carrying carriage and is provided on its outer end with an enlarged portion 145 which limits its forward movement. The stripper is pressed yieldingly forward by means of a spring 146 which is coiled about a stud 147 and is provided with a depending end engaging the rear end of the ejector. The stud 147 is carried by a bracket 148 secured to the cross bar 84 of the mold carrying carriage, Figs. 5 and 17.

The upper portion of the blank is forced out of the mold by two positively operated ejectors 149 arranged to act upon the upper corners of the blank, Figs. 5, 16, 21 and 22. These ejectors are arranged to play through holes extending through the mold block and the bar 84 on which the block is mounted, and are carried by a rod 150 upon which they are adjustably secured. This rod is mounted in arms 151 secured to the opposite ends of a rock shaft 152. The rock shaft 152 is mounted in bearings 153 formed in brackets secured to the cross bar 84. The rock shaft 152 is operated at proper intervals through an arm 154 which projects from the shaft and is provided at its upper end with a roll 155 arranged to engage a groove formed in an arm 156, Figs. 21 and 22. The grooved arm 156 is secured to one end of a rock shaft 157 which is mounted in a fixed bearing 158 and is provided at its opposite end with an arm 159. This arm 159 is provided at its upper end with a roll 160 which engages a cam groove formed in the disk 161 secured to the shaft 53. During the upward and downward travel of the mold carrying carriage the roll 155 travels in the groove in the arm 156 and this arm is operated by the cam 161 to advance and retract the ejectors 149 at the proper times.

Figure 18:
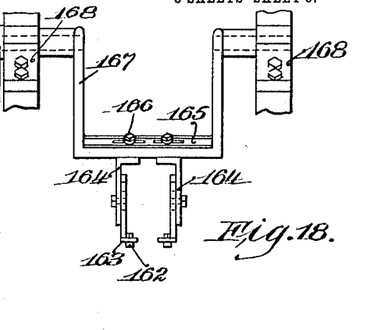
Fig. 18 is a detail view of the ejector fingers.

When the blank is forced out of the mold by the operation of the ejectors during the upward movement of the mold carrying carriage, it will either drop down between the presser and mold or will be forced downward by the action of the delivery fingers 162 which are arranged to act upon the upper edge of the blank as the mold carrying carriage comes into its upper position indicated in Fig. 5. The delivery fingers are secured upon the front ends of plates 163 in such manner that they may be adjusted vertically on the plates, and the plates are secured to brackets 164 in such manner that they may be adjusted forward or backward, Fig. 18. The brackets 164 are secured to a bar 165 by means of bolts 166 which pass through slots in the bar and engage the feet of the brackets. By reason of this connection the brackets may be adjusted toward and from each other upon the bar in positioning the fingers 162 to suit the size of the blank being operated upon. The bar 165 is carried upon arms 167, the outer ends of which are provided with pivots engaging bearings 168 which are formed in brackets secured to the side frames of the machine and arranged in line with each other. The arms 167 are rocked at the proper time to carry the delivery fingers 162 downward against the upper edge of the blank by the action of a cam 169 which is secured to the shaft 57, Fig. 2. This cam acts upon one end of a bell crank lever 170, the other end of which is connected by means of a link 171 with an arm 172 secured to one of the pivots for the arms 167. The bell crank lever 170 is provided with a series of holes, in the end of which the link 171 is connected, so that the movement imparted to the delivery fingers by the cam 169 may be varied as required by shifting the connection between the link 171 and bell crank lever from one hole to another.

When the skived blank is delivered from between the mold and presser it passes down back of the presser carrying plate 94 and is received upon supports 173 which are secured upon the rear side of the plate. The blank is guided and positioned upon the supports 173 by vertically arranged guide plates 174 which are also secured upon the rear side of the plate 94, Figs. 5, 12, 19 and 20. The guide plates 174 are somewhat inclined and are adjustably secured to the plate 94 by screws 175 which pass through slots in the plate so that the guide plates may be properly adjusted to suit the length of the blanks being operated upon. The rear face of the plate 94 is also provided with projecting ribs 176 arranged between the guide plates 174, and which serve to hold the blank away from the face of the plate 94, and also act to stack the blanks upon the receiving table which is to be described. The rear face of the plate 94 is also recessed at 177 between the ribs 176 so that the blank retainer to be described may pass back of the plane of the ribs 176 and retain the blank against the end of the stack of blanks upon the receiving table.

The skived blanks are stacked upon a receiving table 178 the front or receiving end of which is connected with the presser carrying plate 94 by means of pivot pins passing through lugs 179 on the front end of the table and through lugs 180 on the presser carrying plate, Figs. 5, 6, 7 and 12. The rear end of the receiving table is provided with lugs 181 through which the rear end of the table is pivotally connected to a slide 182 mounted in fixed guideways 183. The front end of the receiving table is provided with slots or recesses 184 into which the supports 173 on the rear face of the plate 94 projected so that the supports bridge over the space between the rear face of the plate 94 and the end of the receiving table whatever the relative position of the receiving table and plate 94. Guide plates 185 are secured upon the upper face of the receiving table to form a guideway or magazine within which the blanks are stacked. These guide plates 185 are adjustably secured upon the receiving table by means of bolts passing through slots 186 in the table and engaged by thumb nuts 187. By adjusting the guide plates they may be brought into proper relation to guide and retain blanks of different lengths in proper relation upon the receiving table. The receiving table is provided with a central depression or slot 188 which is partially closed by two plates 189 which project over the edges of the slot to form an under-cut groove which may be used in guiding a suitable follower block when starting the machine. The rear ends of the plates 189 are cut away to form an opening 190 of the same width as the groove 188 so that the retaining device on the bottom of the follower block may be introduced and removed from said groove.

The retainer for retaining the stacked blanks upon the receiving table comprises a finger 191 which projects upward from the free end of a T-shaped lever 192 which is pivoted at the points 193 to the sides of the receiving table. The lever 192 is formed in two sections adjustably secured together by a bolt 194 so that the retaining finger 191 may be adjusted to bring it into proper relation to the presser-carrying plate 94 and end of the receiving table 178.

The lever 192 is rocked about the pivotal points 193 at proper intervals by the action of a cam 195 which is secured to the shaft 59 and is connected with the lever 192 through the following devices (Figs. 5 and 6.) The cam 195 engages a roll at the lower end of a lever 196, the upper end of which is connected by a link 197 to a slide 198. The slide 198 is guided upon a cross bar 199 and is provided with a vertical arm 200 in which a cam groove 201 is formed. This cam groove is engaged by a roll on the lower end of one arm of a bell crank lever 202 which is pivoted to the under side of the receiving table. The other arm of the bell crank lever is provided with a pin 203 which engages a slot formed in the under side of the lever 192.

During the up-and-down movements of the mold carrying slide and of the receiving table which is pivotally connected thereto, the roll on the bell crank lever 202 rides up and down in the slot 201, and during this movement the slide 198 is moved forward or back to impart the proper swinging movements to the lever 192 which carries the blank retaining finger.

As the mold carrying carriage moves upward into the position indicated in Fig. 5, the blank which was acted upon by the skiving cutter during the downward movement of the carriage is delivered from between the mold and presser and directed on to the supports 173. At this time the blank retaining finger 191 is swung up into the position indicated in Fig. 5, where it will engage and retain the blanks which have been previously stacked upon the receiving table. The blank delivered on to the supports 173 will pass down back of the blank retaining fingers and will rest against the ribs on the rear face of the presser carrying plate 94. Now when the mold-carrying carriage moves downward to carry the succeeding blank against the skiving cutter, the presser-carrying plate 94 and the end of the receiving table will be moved toward each other by reason of the clamping movement of the presser plate, and also by reason of the pivotal connection between this plate and the receiving table. During this movement the retaining finger 191 will be swung down into the position indicated in Fig. 6, and the blank which rests against the ribs on the rear face of the plate 94 will be pressed against the end of a series of blanks held stacked on the receiving table, the stacked blanks being forced back along the table. When the mold carrying carriage again moves upward the blank retaining finger 191 will be swung upward into a position back of the blank which has been added to the end of the stack of blanks, the finger passing through the recess 177 in the rear face of the plate 94 and back of the plane of the ribs 176. During the continued upward movement of the mold carrying carriage the blank at the end of the stacked series will be held by the retaining finger 191 while the parts will again be moved into the position indicated in Fig. 5 ready to receive the blank which has been acted upon by the skiving cutter during the downward movement of the mold carrying carriage.

Figure 12:
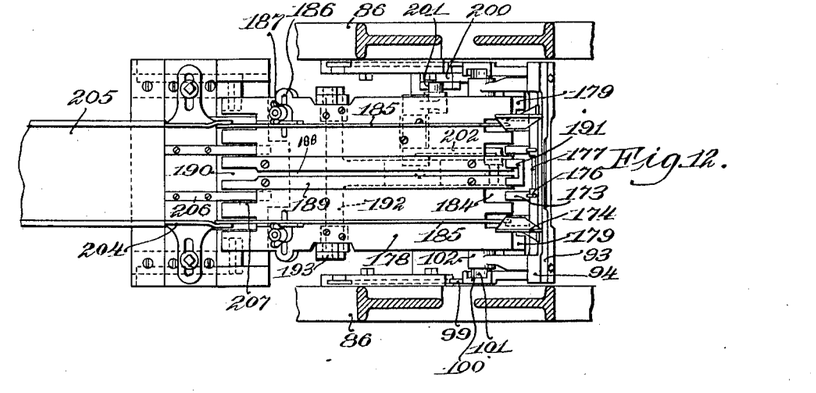
Fig. 12 is a plan view of the stacking table and certain of the parts coöperating therewith.
Figure 13:
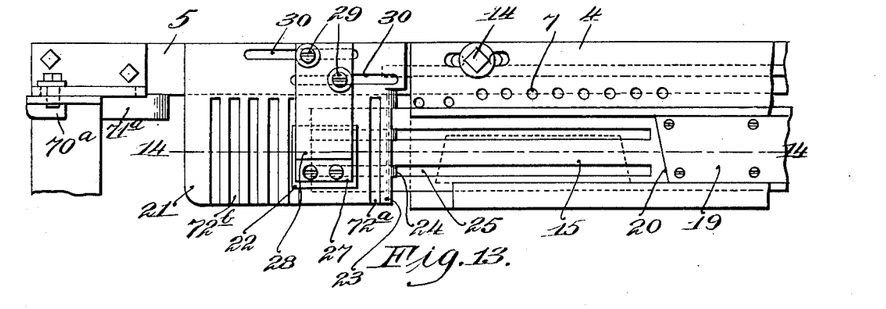
Fig. 13 is an enlarged front elevation showing the feed slide and blank supporting devices, the blank holding magazine being removed for the sake of clearness.
Figures 14, 15:
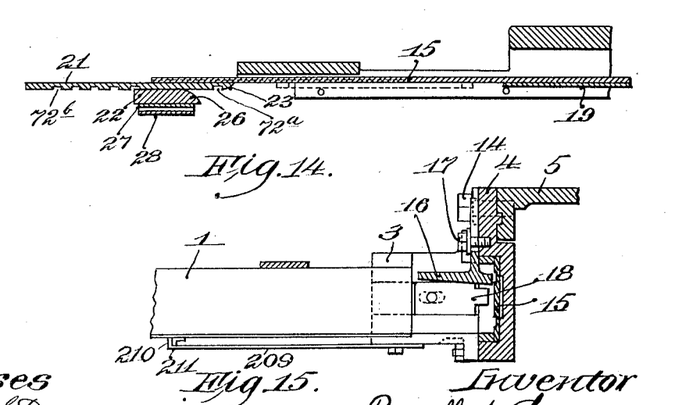
Fig. 14 is a horizontal sectional view on line 14—14, Fig. 13.
Fig. 15 is a sectional view through the center of the blank carrying magazine or tray.

The blanks which are stacked upon the receiving table are moved by the addition of blanks to the end of the stack progressively along the receiving table between the guide plates 185 and are directed onto the upper surface of the slide 182 to which the rear end of the receiving table is pivoted. Side guide plates 204 are adjustably secured upon the upper face of the slide 182 so that they form continuations of the side guides 185 on the receiving table, and serve to maintain the stacked blanks in proper alinement and to direct them into the receiving end of a tray 205. The blanks as they pass from the end of the receiving table onto the slide 182 are supported upon thin strips 206 which are secured in the upper face of the slide, and extend into slots 207 formed in the rear end of the supporting table, the free ends of the strips extending under the table at the ends of the slots 207 (Fig. 12). These strips serve to bridge over the open space which would otherwise be formed between the end of the supporting table and the slide by reason of the swinging movements of the receiving table.

The receiving tray 205 may be permanently attached to the slide 182 and the skived blanks be removed from the tray from time to time. It is preferred, however, to support the tray 205 so that it may be readily removed when filled and an empty tray substituted in its place. For this purpose the slide 182 is recessed upon its upper face to receive the end of the tray 205 and to position the tray with its bottom substantially flush with the surface of the slide 102 and with the sides of the tray substantially in line with the side guides 204.

The receiving tray 205 may be supported at its other end by a cord similar to the cord 208 which is employed for supporting the outer end of the supply tray 1 and the end of the tray may be retained in position in the recesses in the slide 182 by devices similar to those shown for retaining the front end of the tray 1 in position in the recessed brackets 2 and 3. These devices which are shown in connection with the supply tray and are not shown in connection with the receiving tray, comprise spring-latching plates 209 which are secured to the under sides of the brackets 2 and 3, and are provided with upturned ends 210 arranged to engage lugs 211 secured to the under side of the tray 1 (Figs. 1, 2, 5, 6 and 15).

The general operation of the machine will be readily understood from the description of the construction and mode of operation of the various parts and mechanisms already given.

At each revolution of the cam shafts 57 and 59 a blank is operated upon by the skiving cutter and is delivered at the end of the receiving table, a previously skived blank is stacked upon the receiving table, a new blank is delivered between the presser and mold, and a blank is separated from the blanks in the magazine and delivered to the holding and retaining plates ready to be transferred to the mold and presser. Thus the individual blanks are fed to the bending and skiving devices, are operated upon by said devices, and are delivered and stacked in a rapid and efficient manner, while the fresh blanks may be conveniently supplied to the machine and the completed blanks conveniently removed preparatory to the subsequent manipulation to which they are to be subjected.

Having explained the nature and object of the invention and specifically described one form of machine in which the various features may be embodied, what I claim is:—

1. A cutting machine, having, in combination, a reciprocating mold carriage, a mold and presser thereon, a cutter, a receiving table moving with the mold carriage, and devices for stacking the cut blanks on the table, substantially as described.

2. A cutting machine, having, in combination, a reciprocating mold carriage, a mold and presser carrier thereon, a cutter, a receiving table having one end pivoted to the presser carrier, a support for the other end of the table, and means for supporting a receiving tray at the end of the table, substantially as described.

3. A cutting machine, having, in combination, a blank carrying magazine, a feed slide reciprocating across the end of the magazine, a supporting plate and clamp between which the blanks are carried by the slide and feeding fingers for delivering the blanks from between the supporting plate and clamp, substantially as described.

4. A cutting machine, having, in combination, a blank carrying magazine, comprising brackets provided with horizontal and vertical plates recessed to receive the end of a removable tray, a tray fitting within said recess, and devices for separating individual blanks from the series of blanks in the magazine, substantially as described.

5. A cutting machine, having, in combination, a blank carrying magazine comprising relatively adjustable brackets having horizontal and vertical plates recessed to receive the end of a tray, a tray fitting said recesses, and a feed slide mounted to reciprocate across the end of the magazine, substantially as described.

6. A cutting machine, having, in combination, bending and cutting devices, blank retaining devices, devices for transferring blanks from the retaining devices to the bending and cutting devices, a blank-carrying magazine, an adjustable plate on which said magazine is mounted, a feed slide for transferring blanks from the magazine to said retaining devices, and operating devices adjustably connected with said slide, substantially as described.

7. A cutting machine, having, in combination, bending and cutting devices, blank retaining devices, devices for transferring blanks from the retaining devices to the bending and cutting devices, a magazine adjustable for different sizes of blanks, a supporting plate carrying the magazine and adjustable with relation to the retaining devices, a feed slide for transferring the blanks from the magazine to the retaining devices, and means for operating the feed slide, substantially as described.

8. A cutting machine, having, in combination, bending and cutting devices, a supporting plate arranged in line with the bending and cutting devices, a holding clamp coöperating therewith to retain a blank in position to be transferred to the bending and cutting devices, a feed slide arranged to pass back of the supporting plate and provided with one or more grooves, and fingers projecting from the edge of the supporting plate into said grooves, substantially as described.

9. A cutting machine, having, in combination, a reciprocating mold carriage, a mold and presser carrier thereon, a cutter, a receiving table having one end moving with the mold carriage, devices for stacking the cut blanks on the table, and a receiving tray supported at the delivery end of the receiving table, substantially as described.

10. A cutting machine, having, in combination, a reciprocating mold carriage, a mold and presser carried thereon, a skiving cutter, and delivery devices arranged to engage the edge of the blank and push it from between the mold and presser, substantially as described.

11. A cutting machine, having, in combination, a reciprocating mold carriage, a mold and presser carried thereon, a punch and stripper arranged in the lower central portion of the mold, and positively operated ejectors arranged in the upper part of the mold, substantially as described.

12. A cutting machine, having, in combination, a reciprocating mold carriage, a mold mounted thereon, a presser carrier pivoted on said carriage, a receiving table pivoted at its receiving end to the presser carrier, a slide to which the delivery end of the receiving table is pivoted, and on to which the blanks pass from a receiving table.

13. A cutting machine, having, in combination, a reciprocating mold carriage, a mold mounted thereon, a presser carrier pivoted thereon, a receiving table pivoted at its receiving end to the presser carrier, blank supports upon the rear side of the presser carrier, and devices for directing the blanks delivered from between the presser and mold on to said supports, substantially as described.

14. A cutting machine, having, in combination, a reciprocating mold carriage, a mold mounted thereon, a presser carrier pivoted thereon, a cutter, a receiving table having its receiving end pivoted to the presser carrier, and a blank retainer for engaging the end of the stack of blanks upon the receiving table, substantially as described.

15. A cutting machine, having, in combination, a reciprocating mold carriage, a mold and presser carried thereon, a skiving cutter, a receiving table having its receiving end pivoted to the presser carrier, a blank retainer mounted on the receiving table, and means for moving the blank retainer into and out of contact with the blanks upon the table, substantially as described.

16. A cutting machine, having, in combination, a mold, presser and cutter, a magazine for blanks, a separating device arranged to engage the end of the foremost blank in the magazine and feed it out of the magazine, devices for delivering the blanks to the presser and mold, and mechanism for relatively reciprocating the cutter and the mold and presser to shave off the projecting edges of the blank, substantially as described.

17. A cutting machine, having, in combination, a mold, presser and cutter, a magazine for blanks, a feed slide reciprocating across the end of the magazine, and provided with a shoulder arranged to engage the end of the foremost blank in the magazine, devices for delivering the blanks to the mold and presser and positioning the blanks, and mechanism for relatively reciprocating the cutter and the mold and presser to shave off the projecting edges of the blank, substantially as described.

18. A cutting machine, having, in combination, a mold, presser and cutter, a horizontally arranged magazine for supporting a stack of blanks on edge, devices for engaging the end of the foremost blank in the magazine and feeding it out of the magazine, devices for transferring the blanks to the mold and presser and positioning the blanks, and mechanism for relatively reciprocating the cutter and the mold and presser to shave off the projecting edges of the blank, substantially as described.

19. A cutting machine, having, in combination, a reciprocating mold and presser, a cutter arranged to shave off the projecting edges of the blank, a rotary cam mounted in fixed bearings and connections between the cam and reciprocating presser for moving the presser toward and from the mold, substantially as described.

20. A cutting machine, having, in combination, a reciprocating mold carriage, a mold and presser mounted thereon, a slide provided with a guideway parallel to the travel of the mold carriage, a projection on the presser engaging the guideway and a rotary cam and connections for operating the slide, substantially as described.

21. A cutting machine, having, in combination, a reciprocating carriage, a mold and presser thereon, a cutter arranged to shave off the edges of the blank projecting between the mold and presser, a magazine for blanks and mechanism for separating individual blanks from the magazine and positioning them between the mold and presser, substantially as described.

22. A cutting machine, having, in combination, a mold and presser for bending a blank into dished shape, a cutter, a magazine for blanks, means for feeding individual blanks lengthwise from the magazine, means for carrying the blanks edgewise between the mold and presser, and means for relatively actuating the mold, presser and cutter to shave off the projecting edges of the blank, substantially as described.

23. A cutting machine, having, in combination, a vertically reciprocating mold carriage, a mold and presser thereon for bending a blank into dished shape, a cutter for shaving off the projecting edges of the dished shape blank, a magazine for blanks, means for feeding individual blanks from the magazine into position above the mold and presser, means for delivering the blanks vertically between the mold and presser and positioning the blanks, substantially as described.

24. A cutting machine, having, in combination, a magazine for supporting blanks on edge, a mold and presser for bending a blank into dished shape, arranged below and to one side of the magazine, devices for feeding individual blanks endwise from the magazine into position above the mold and presser, means for delivering the blank edgewise between the mold and presser and positioning the blank, and a knife for shaving off the projecting edges of the blank, substantially as described.

25. A cutting machine, having, in combination, a blank carrying magazine, a feed slide reciprocating across the end of the magazine, a plate in front of which the blanks are fed by the feed slide, means for coöperating with the plate to support the blanks, and devices for feeding the blanks laterally off the plate, substantially as described.

26. A cutting machine, having, in combination, bending and cutting devices, a plate arranged in line with the bending and cutting devices, means coöperating therewith to retain a blank in position to be transferred to the bending and cutting devices, a feed slide arranged to pass back of the plate and provided with one or more grooves and fingers projecting from the edge of the plate into said grooves, substantially as described.

27. A cutting machine, having, in combination, a reciprocating mold carriage, a mold plate mounted thereon, a coöperating presser plate, blank centering fingers on the mold plate, and devices for operating the centering fingers including a rotary cam mounted in fixed position, substantially as described.

28. A cutting machine, having, in combination, a reciprocating mold carriage, a mold plate mounted thereon, a coöperating presser plate, blank centering fingers on the mold plate, levers mounted on the mold carriage and connected with the fingers, levers mounted upon the fixed pivots and arranged to operate the levers on the mold carriage, and a rotary cam for actuating the fixed levers, substantially as described.

29. A cutting machine, having, in combination, a reciprocating mold carriage, a mold and presser thereon, ejectors for discharging the blank from the mold, a lever on the mold carriage for operating the ejectors, an actuating device having a sliding connection with the lever, and a rotary cam for operating the actuating device, substantially as described.

30. A cutting machine, having, in combination, a reciprocating mold carriage, a mold and presser mounted thereon, a cutter for shaving off the projecting edges of the blank held between the mold and presser, an actuating device having a sliding connection with the presser and a rotary cam for operating the actuating device, substantially as described.

In testimony whereof I affix my signature, in presence of two witnesses.

ROSWELL A. LANCEY.

Witnesses:
IRA L. FISH,
ANNIE C. RICHARDSON.

---

Copies of this patent may be obtained for five cents each, by addressing the "Commissioner of Patents, Washington, D. C."